UNITED STATES PATENT OFFICE.

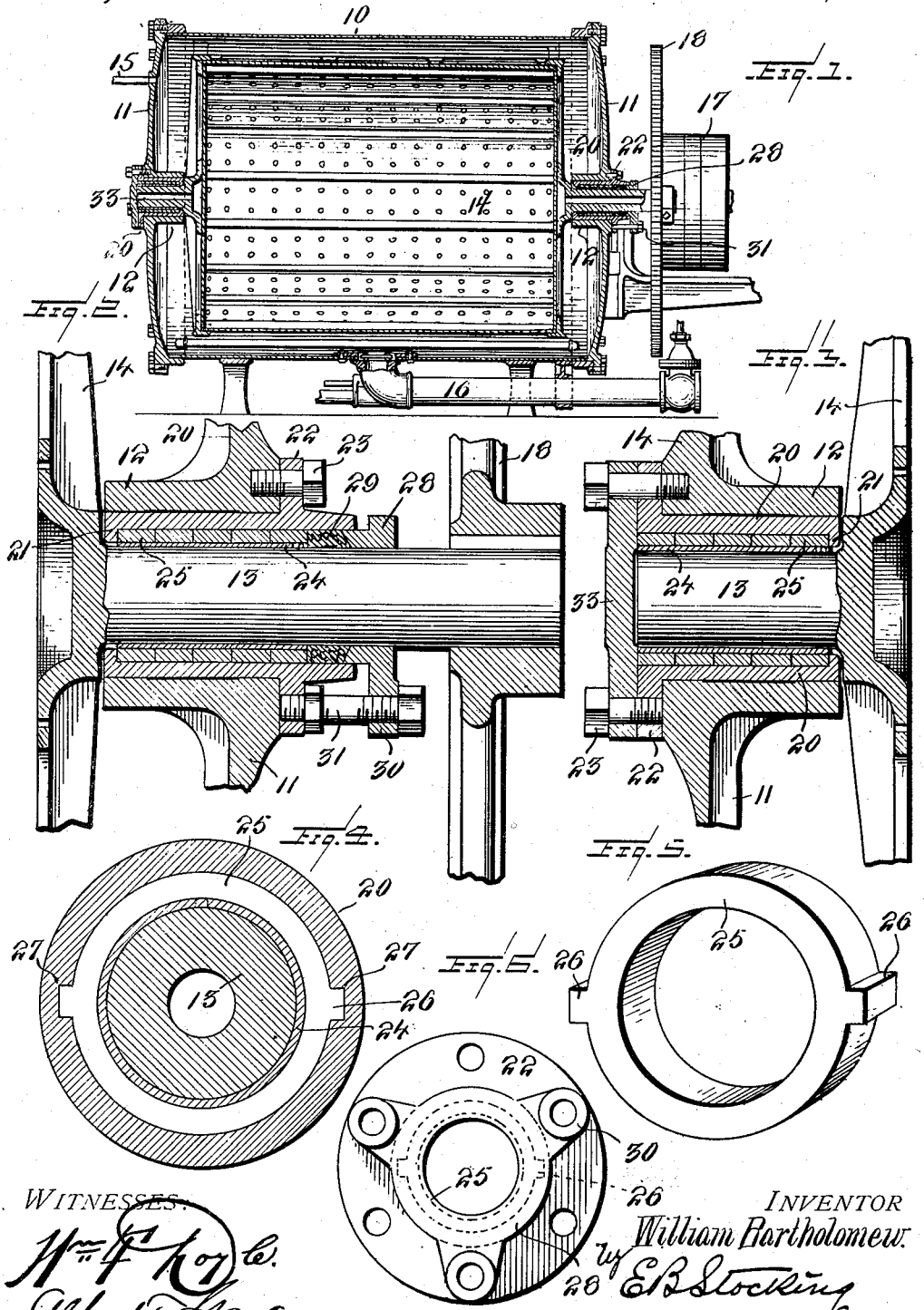

WILLIAM BARTHOLOMEW, OF CHICAGO, ILLINOIS, ASSIGNOR TO TROY LAUNDRY MACHINERY COMPANY, LTD., OF CHICAGO, ILLINOIS, A CORPORATION OF NEW YORK.

BEARING FOR STERILIZING-WASHERS.

940,663. Specification of Letters Patent. Patented Nov. 23, 1909.

Application filed April 14, 1909. Serial No. 489,801.

*To all whom it may concern:*

Be it known that I, WILLIAM BARTHOLOMEW, citizen of the United States, residing at Chicago, county of Cook, and State of Illinois, have invented certain new and useful Improvements in Bearings for Sterilizing-Washers, of which the following is a specification, reference being had therein to the accompanying drawing.

This invention relates to a trunnion bearing, and particularly to a structure adapted for application to a sterilizing washing machine where it is essential to effect a steam tight joint at the bearings thereof.

The invention has for an object to provide a bearing comprising a boxing having disposed therein a series of bearing rings each being held against rotative movement by means of a projection upon its periphery adapted to enter a corresponding recess in the bearing box.

Other and further objects and advantages of the invention will be hereinafter fully set forth and the novel features thereof defined by the appended claims.

In the drawing:—Figure 1 is a vertical section showing one application of the invention; Fig. 2 is an enlarged section at the right end of Fig. 1; Fig. 3 is a similar section at the left of Fig. 1; Fig. 4 is a vertical section of the bearing box and packing rings therein; Fig. 5 is a detail perspective of one of the packing rings, and Fig. 6 is an end elevation of the packing gland and bearing box to which it is applied.

Like numerals refer to like parts in the several views of the drawing.

While this invention is applicable to various machines in which it is desired to prevent the escape of steam at the trunnion bearings of the revolving member thereof, still it is particularly adapted for use in connection with a sterilizing washing machine, as shown in Fig. 1. In this application of the invention, the casing 10 is provided at opposite ends with heads 11 each of which has inwardly extending bearings 12 adapted to receive the trunnions 13 carried by a revolving washing cylinder 14. The casing 10 is maintained at the proper temperature for sterilizing purposes by means of the steam pipe 15 disposed at the top thereof and is also provided with a discharge pipe 16, as usual. The revolving cylinder 14 is adapted to be rotated by any desired means, for instance the pulleys 17 coöperating with a gear 18 disposed on the trunnions thereof.

Referring to the right of Fig. 1, it will be seen that within the bearing 12 of the end plate 11 a packing box 20 is disposed which is provided with an end flange 21 at its inner end, and a securing flange 22 abutting against the outer face of the end or cover 11. This flange is provided with bolts 23 by which it may be secured in contact with said cover. The trunnion 13 is provided with a removable sleeve 24 preferably of bronze or other suitable bearing material secured to the trunnion, and intermediate of this sleeve and the box 20 a series of packing rings 25 are disposed. These rings are formed with one or more peripheral projections 26 adapted to seat in a coöperating recess 27 disposed in the bearing 20 in order to prevent rotative movement of the rings. These rings may be formed of any desired bearing material, such as Babbitt metal and are held against lateral movement in the bearing by means of the gland 28 and interposed packing 29. The gland is secured in position by means of a series of lugs 30 adapted to receive bolts and nuts 31 by which proper tension may be applied thereto, as shown in Fig. 2. The structure just described is particularly adapted for the end of the machine where the power is applied and from which the trunnion must extend for that purpose. At the opposite end of the machine the trunnion is provided with a sleeve 24 and with a similar boxing 20 having the flange 22, being secured by means of bolts 23. These bolts also retain at this end of the machine a cap plate 33 at the end of the trunnion 13, while the boxing 20 is provided with a flange 21 at the opposite end from the cap plate to retain the rings 25 against lateral movement. These rings are similar in construction to those described in connection with Fig. 2, and the cap plate 33 holds the rings in contact with each other and the flange 21 so as to obviate the necessity of using a gland at this end of the machine.

In the operation of the invention it will be seen that the use of the bronze shaft sleeve prevents the wearing of the trunnion and is readily replaceable so as to maintain a steam tight bearing at all times, and a bearing in which the minimum of friction is prevented as the rings are positively held against rotation with the trunnions extended therethrough. The cap plate at one end of the machine and the packing gland at the opposite end prevent any escape of steam from the bearing and also permit the adjustment of the rings into close relation with each other and with the retaining flange of the boxing into which they are introduced.

It will therefore be seen that the invention presents a simple, efficient and economically constructed form of bearing particularly adapted for washing and sterilizing machines.

Having described my invention and set forth its merits, what I claim and desire to secure by Letters Patent is:—

1. A trunnion bearing comprising a bearing box provided with an inwardly extending flange at one end, a series of packing rings disposed within said box in contact with each other and the inner ring being in contact with said flange, and interlocking means between said box and rings for retaining them against relative rotation.

2. A trunnion bearing comprising a bearing box provided with an inwardly extending flange at its inner end, a series of continuous packing rings disposed within said box, and peripheral projections from said rings adapted to enter a recess in said box to retain the rings against rotation therein.

3. A trunnion bearing comprising a bearing box provided with an inwardly extending flange at its inner end, a series of continuous packing rings disposed within said box, means for retaining said rings in position against rotation, an outwardly extending flange carried by said box, and means for connecting said flange and retaining means.

4. A trunnion bearing comprising a boxing having an inwardly extending flange at one end, and a series of continuous wear rings disposed in said boxing in contact with said flange and having peripheral projections interlocked with said boxing to retain them against rotation therein.

5. A trunnion bearing comprising a boxing having an inwardly extending flange at one end, a series of continuous wear rings disposed in said boxing in contact with said flange and having peripheral projections interlocked with said boxing to retain them against rotation therein, and a packing gland disposed within one end of said boxing to exert lateral pressure against said rings.

6. A trunnion bearing comprising a boxing having an inwardly extending flange at one end, a series of continuous wear rings disposed in said boxing in contact with said flange and having peripheral projections interlocked with said boxing to retain them against rotation therein, and a cap plate disposed at one end of said boxing to retain the rings therein.

7. A trunnion bearing comprising a boxing having longitudinally extending grooves at the opposite sides thereof, and coöperating wear rings provided with peripherally extended lugs adapted to enter said grooves.

8. A trunnion bearing comprising a boxing, a series of continuous wear rings disposed therein and having peripheral projections interlocked with said boxing, and a trunnion provided with a bearing sleeve mounted to contact with the inner face of said rings.

In testimony whereof I affix my signature in presence of two witnesses.

WILLIAM BARTHOLOMEW.

Witnesses:
WM. KROGMAN,
J. A. VOGELSANG.